United States Patent
Jakob (10) Patent No.: US 8,220,810 B2
(45) Date of Patent: Jul. 17, 2012

(54) COUNTERSTEERING REAR AXLE OF A VEHICLE

(75) Inventor: Benjamin Jakob, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 35 days.

(21) Appl. No.: 12/966,344

(22) Filed: Dec. 13, 2010

(65) Prior Publication Data

US 2011/0080039 A1     Apr. 7, 2011

Related U.S. Application Data

(63) Continuation of application No. PCT/EP2009/003989, filed on Jun. 4, 2009.

(30) Foreign Application Priority Data

Jul. 2, 2008  (DE) .......................... 10 2008 031 123

(51) Int. Cl.
*B60G 3/12* (2006.01)
*B60G 21/05* (2006.01)
*B62D 7/18* (2006.01)
*B62D 17/00* (2006.01)

(52) U.S. Cl. ....... 280/124.128; 280/86.75; 280/124.116; 280/93.512

(58) Field of Classification Search ............. 280/86.758, 280/124.103, 124.116, 124.128, 124.153, 280/93.512, 86.75, 124.107, 124.125, 124.148, 280/124.166, 124.167, 93.51

See application file for complete search history.

(56) References Cited

U.S. PATENT DOCUMENTS

| | | | | |
|---|---|---|---|---|
| 4,421,332 A | * | 12/1983 | Kosak et al. | 280/124.153 |
| 4,429,900 A | * | 2/1984 | Feher | 280/124.128 |
| 4,432,564 A | * | 2/1984 | Tronville | 280/124.106 |
| 5,215,329 A | * | 6/1993 | Santo | 280/124.128 |

(Continued)

FOREIGN PATENT DOCUMENTS

DE       281 154 A5     8/1990

(Continued)

OTHER PUBLICATIONS

German Search Report dated Mar. 20, 2009 including partial English-language translation (Nine (9) pages).

(Continued)

*Primary Examiner* — Paul N Dickson
*Assistant Examiner* — Laura Freedman
(74) *Attorney, Agent, or Firm* — Crowell & Moring LLP (57) ABSTRACT

A countersteering vehicle rear axle induces a rotational motion of a wheel carrier about a virtual spread axis in the toe-in direction under the influence of a lateral force on the outside cornering wheel mounted on the wheel carrier. A support member exhibits a section, which extends essentially parallel to the plane of the wheel carrier, and a section, which is connected, when viewed in the direction of travel, to former section behind the wheel center point and extends essentially in the transverse direction of the vehicle. In a lateral projection, the support member is inclined in relation to the vertical direction in essentially the same way as the virtual spread axis. This support member is supported at least on the free ends of a sheet metal support plate, which in a lateral projection is approximately U-shaped and which in turn is mounted on the axle body.

13 Claims, 5 Drawing Sheets

U.S. PATENT DOCUMENTS

| | | | |
|---|---|---|---|
| 5,246,248 A * | 9/1993 | Ferguson | 280/5.524 |
| 5,324,073 A * | 6/1994 | Alatalo et al. | 280/124.116 |
| 5,409,254 A * | 4/1995 | Minor et al. | 280/124.166 |
| 5,577,761 A * | 11/1996 | Tabata | 280/124.13 |
| 6,086,162 A * | 7/2000 | Pinch et al. | 301/124.1 |
| 6,616,157 B2 * | 9/2003 | Christophliemke et al. | 280/124.106 |
| 7,044,565 B2 * | 5/2006 | Kang | 301/127 |
| 7,427,113 B2 * | 9/2008 | Choi | 301/124.1 |
| 7,431,315 B2 * | 10/2008 | Jargowsky et al. | 280/124.128 |
| 7,588,261 B2 * | 9/2009 | Kawanobe et al. | 280/124.128 |
| 7,914,019 B2 * | 3/2011 | Jakob | 280/86.75 |
| 7,967,308 B2 * | 6/2011 | Toepker | 280/124.106 |
| 2006/0082094 A1 | 4/2006 | Mosler | |
| 2007/0126200 A1 * | 6/2007 | Ogawa et al. | 280/124.169 |

FOREIGN PATENT DOCUMENTS

| | | | |
|---|---|---|---|
| DE | 4119520 A1 * | 12/1992 | |
| DE | 4141821 A1 * | 6/1993 | |
| DE | 195 17 074 A1 | 11/1996 | |
| DE | 103 21 877 B4 | 4/2005 | |
| DE | 10 2004 050 624 A1 | 5/2006 | |
| DE | 603 15 541 T2 | 5/2008 | |
| EP | 1 527 911 A1 | 5/2005 | |
| EP | 1 561 611 A1 | 8/2005 | |
| EP | 1 612 068 A1 | 1/2006 | |
| EP | 1 757 468 A1 | 2/2007 | |
| EP | 2 019 023 A1 | 1/2009 | |
| FR | 2 926 248 A1 | 7/2009 | |
| JP | 2005-119601 A | 5/2005 | |

OTHER PUBLICATIONS

International Search Report dated Sep. 4, 2009 including English-language translation (Six (6) pages).

* cited by examiner

COUNTERSTEERING REAR AXLE OF A VEHICLE

This application is a continuation of PCT International Application No. PCT/EP2009/003989, filed Jun. 4, 2009, which claims priority under 35 U.S.C. §119 from German Patent Application No. DE 10 2008 031 123.5, filed Jul. 2, 2008, the entire disclosures of which are herein expressly incorporated by reference.

BACKGROUND AND SUMMARY OF THE INVENTION

The invention relates to a countersteering rear axle that is intended for a vehicle and that under the influence of a lateral force on the wheel that is on the outside in a curve and that is mounted on a wheel carrier induces a rotational motion of this wheel carrier about a virtual spread axis in the toe-in direction. In this case the wheel carrier is supported on an axle body, which extends essentially in the longitudinal direction of the vehicle, by way of at least one support member formed from sheet metal. With respect to the relevant prior art reference is made, by way of example, to DD 281 154 A5 and DE 103 21 877 B4.

It is known that simple rear axles of vehicles, in particular the twist beam type axle and also the longitudinal trailing arm type axle and the diagonal trailing arm type axle, can exhibit an oversteering tendency under the influence of a lateral force. Furthermore, the aforementioned prior art already discloses remedial measures for such a lateral force influence. For example, DE 103 21 877 B4 shows a wheel carrier mounting comprising a so-called oscillating plate, in which four elastic pivot bearings are integrated. With this extremely complicated construction the wheel is steered in the toe-in direction under the influence of a lateral force. The same results are obtained in the case of the so-called countersteering rear axle that is disclosed in DD 281 154 A5, but with a considerably simpler design. However, the structural durability of its disk-shaped suspension element, which bears the wheel carrier, leaves much to be desired.

Therefore, the object of the present invention is to provide a relatively simple to build so-called countersteering rear axle which, under the influence of a lateral force on a wheel that is on the outside in a curve and which is mounted on a wheel carrier, induces a rotational motion of this wheel carrier about a virtual spread axis in the toe-in direction. The wheel carrier is supported on an axle body, which extends essentially in the longitudinal direction of the vehicle, by way of at least one support member formed from sheet metal. In this case, the countersteering rear axle satisfies the general strength requirements of vehicle axles (for example, for passenger vehicles).

This and other objects are achieved in that the support member exhibits a section, which extends essentially parallel to the plane of the wheel carrier, and a section, which is connected, when viewed in the direction of travel, to the former section behind the wheel center point and extends essentially in the transverse direction of the vehicle, and which in a lateral projection is inclined in relation to the vertical direction in essentially much the same way as the virtual spread axis. This support member is supported at least on the free ends of a sheet metal support plate, which in a lateral projection is approximately U-shaped and which, in turn, is mounted on the axle body.

Working on this basis, the invention proposes a particular support structure for the wheel carrier in the form of the herein so-called support member, which, on the one hand, exhibits enough rigidity and strength to be able to guide precisely with respect to the wheel camber the wheel or, more particularly, the wheel carrier, over the entire service life of the vehicle. The support member, on the other hand, exhibits a flexible region, which defines the desired spread axis. In this context the support member of the invention exhibits in essence two sections, which describe different planes and which are connected together by way of an edge or the like, about which these two sections can be slightly swivelled in relation to each other, so that this edge forms at least approximately or partially the spread axis (also called the steering axis). Therefore, in over-exaggerated terms, the two sections of the support member can be folded about this edge (or rather about the spread axis), in order to achieve the desired toe-in of the wheel under the influence of a lateral force. To this end, the well-known prior art provides that the spread axis has to tilt, as seen in a lateral view, in relation to the vertical plane in such a manner that the latter intersects, as viewed in the direction of travel, the wheel contact plane behind the wheel contact point.

This support member is mounted and/or supported on the axle body at least by way of the sheet metal support plate, which in a lateral view, that is, as viewed in the transverse direction of the vehicle, is approximately U-shaped. To this end, at least the free ends of both legs of the sheet metal support plate, of which the first lies, as viewed in the vertical direction, above the center point of the vehicle, and the second lies below the center point of the vehicle, preferably connected flush fitting with the support member. Preferably, the center region of the support member is connected flush fitting with the axle body, preferably with its free end. Such a configured support member can satisfy the structural durability requirements and is considerably simpler in design than, for example, the arrangement with the four elastic pivot bearings disclosed in DE 103 21 877 B4, which was discussed above.

In order to enhance the rigidity of the support member with the exception of that area of the support member that lies laterally of the spread axis and is, therefore, slightly deformable, the section, which extends in essence parallel to the plane of the wheel carrier, is connected above and/or below the center point of the wheel to another so-called web section, which extends essentially in the transverse direction of the vehicle and which is also connected to the aforementioned section, which extends essentially in the transverse direction of the vehicle and is inclined, like the spread axis, in relation to the vertical plane. This web section lies in a third, essentially horizontal plane, whereas the additional section, which is inclined like the spread axis, can be regarded more as vertically oriented, even though inclined in relation to the vertical plane. The section of the support member that is aligned essentially parallel to the wheel carrier extends essentially in the vertical direction and in the longitudinal direction of the vehicle.

The web section and/or the additional web sections give the support member the shape of a quasi-strut or the like, which is quite evident from the accompanying figures of one embodiment to be explained below.

Similarly, in order to enhance the rigidity of the support member with the exception of the area of the support member that lies laterally of the spread axis and, is, therefore, slightly deformable, a sheet metal reinforcement plate can be provided above the center point of the wheel and/or below the center point of the wheel. The sheet metal reinforcement plate supports the (respective) support member and the sheet metal support plate on the axle body. Preferably, the and/or each sheet metal reinforcement plate is connected flush fitting with the other components, that is, with the axle body and the support member and the sheet metal support plate. Preferably, the end of the respective sheet metal reinforcement plate that faces the support member extends parallel to the desired spread axis, because the contour of the plate can be defined (where such sheet metal reinforcement plates are provided) essentially by its ends facing the support member and/or by the transition regions between the sheet metal reinforcement plates and the support member.

In this context it is possible to describe a continuous upper support region of the support member, in which the upper sheet metal reinforcement plate with its end, which lies opposite the axle body, and the sheet metal support plate are supported, and in an analogous manner of a lower support region of the support member, in which the lower sheet metal reinforcement plate with its end, which lies opposite the axle body, and the sheet metal support plate are supported on the support member. The desired virtual spread axis runs through these two support regions, because these two support regions are in themselves extremely rigid, whereas their environment with respect to the two support regions has a certain degree of flexibility. Thus, this environment, which is formed essentially, on the one hand, by the section of the support member that extends parallel to the wheel carrier and, on the other hand, by the section of the support member that extends essentially in the transverse direction of the vehicle and that is inclined slightly in relation to the vertical plane, can be slightly deformed in relation to the support regions. As a result, the conditions required for the desired pivotability of the first of these two sections in relation to the second of these two sections about the spread axis that extends through the two support regions are met.

If, in the context of an advantageous further development, the upper support region lies, as viewed in the transverse direction of the vehicle, in considerably closer proximity to the center of the vehicle or the axle than the lower support region, then the virtual spread axis, defined by the upper and the lower support region, is inclined, as viewed in the longitudinal direction of the vehicle, in relation to the vertical plane in such a manner that a negative steering roll radius with its advantages that are known to the person skilled in the art can be formed. In particular, during braking operations and, thus, under the influence of a longitudinal force, such a negative steering roll radius can also produce a desired toe-in of the wheel, that is, that the wheel or rather the wheel carrier can be pivoted about the virtual spread axis in the toe-in direction.

In order to be able to generate the desired flexibility or elasticity in the support member, it may also be necessary to provide in certain regions one or more recess(es) in some regions of the support member and/or in one or more section (s) of the same.

In addition to the above-described support finally on the axle body, the wheel carrier can be supported away from the spread axis directly or indirectly by means of at least one additional connecting element, which exhibits a certain degree of flexibility, but preferably once again on the axle body. This flexibility permits the wheel carrier the desired pivot motion about the virtual spread axis. In this case, the connecting element can have an effect on the intensity of this pivot motion and, in particular, can also damp this motion. An example of such a connecting element can be a soft rubber bearing in the axial direction, said axial direction extending tangentially to the direction of rotation of the wheel carrier and the virtual spread axis.

As a consequence, the torsional flexibility about the spread axis can be adjusted and, thus, also the elastokinematic toe-in behavior of the axle. As stated above, such a connecting element exhibiting such a degree of flexibility can damp, in particular, the torsional oscillations about the virtual spread axis and additionally reduce the axle windup during braking operations. In addition, such a connecting element can transfer forces during wheel compression. At this point, the toe setting of the axle can also take place. Once again, reference is made explicitly to the fact that it is not absolutely necessary to use a rubber bearing as such a connecting element, but rather this connecting element can also be formed by a suitable structural component, which exhibits the "flexibility" in the above-described direction. Moreover, this connecting element can be provided preferably between the axle body and the section of the support member that is aligned parallel to the wheel carrier and which can exhibit a suitable extension for this purpose.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
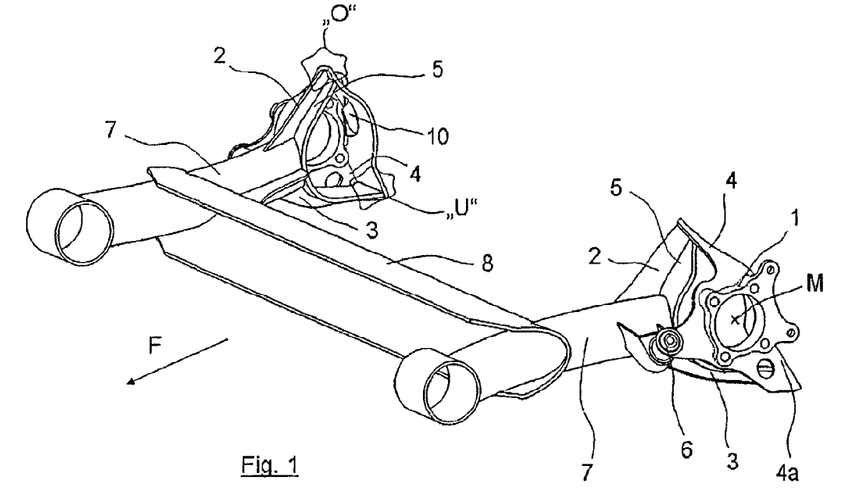
FIG. 1 is a three-dimensional view of an inventive axle, as viewed from the front sloping to the left.
Figure 2:
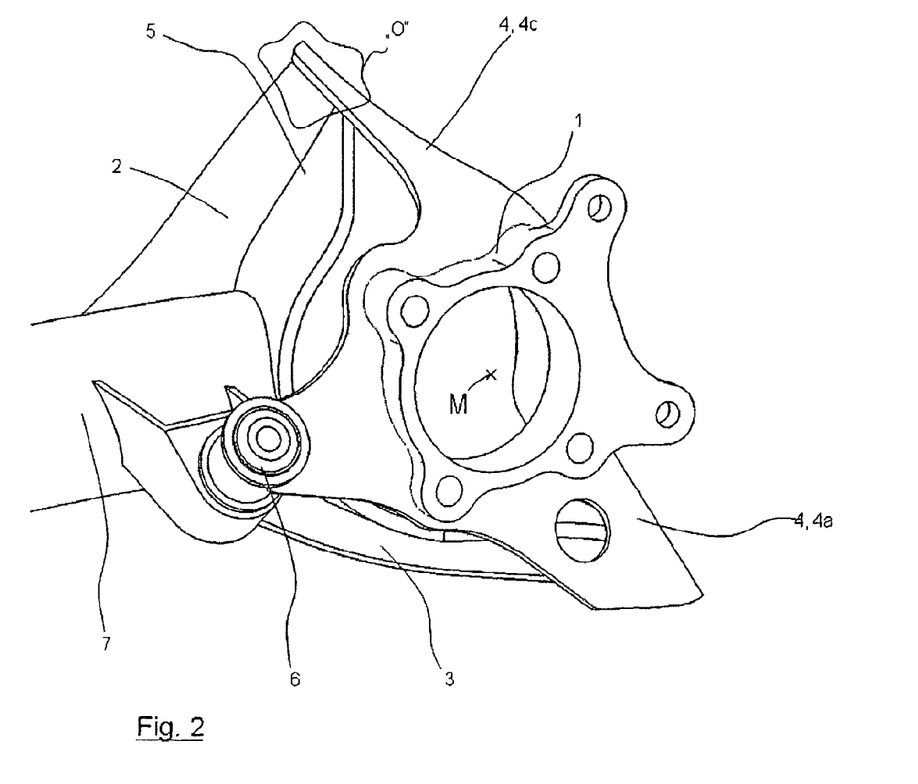
FIG. 2 is an exploded view of the area of the left side wheel carrier from FIG. 1.
Figure 3:
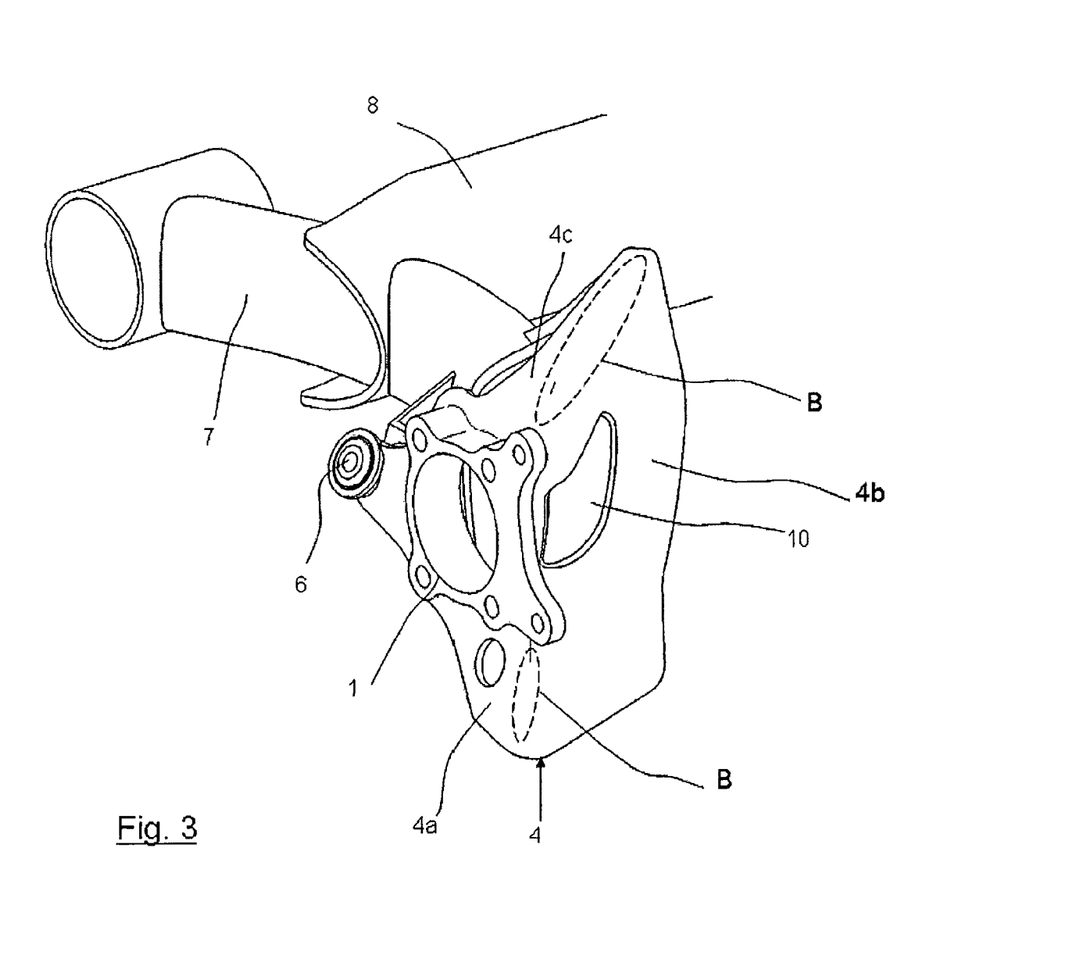
FIG. 3 is a three-dimensional view of the wheel carrier from FIG. 2, as viewed from the rear sloping outwards.

First of all, with respect to FIGS. 1 to 3, the reference numeral 1 denotes the wheel carrier of a rear axle of a vehicle, where this rear axle may be, for example, as depicted in the present invention, a so-called twist beam type axle, the basic construction of which is well known to the person skilled in this art. This rear axle has for each wheel, that is, on the left and right side respectively, a so-called axle body 7 (in this case in the form of a lengthwise tube), which extends essentially in the longitudinal direction of the vehicle (=in the direction of travel F in FIG. 1). Both axle bodies 7 are connected together by a flexurally stiff, but torsionally flexible composite profile 8, which extends in the transverse direction of the vehicle.

Each wheel carrier 1 is supported ultimately on the axle body 7, which is assigned to the wheel carrier, with intercalation of a support member 4. The support member 4 is formed from sheet metal and which, in turn, is supported by a sheet metal support plate 5 and by sheet metal reinforcement plates 2 and 3. In the present embodiment, the wheel carrier 1, more precisely the support member 4, is additionally supported by way of an additional connecting element 6 on the axle body 7, which, however, is not absolutely necessary.

The support member 4 has a section 4a, which extends essentially parallel to the plane of the wheel carrier 1, and a section 4b, which is connected, as viewed in the direction of travel, to the essentially parallel section behind the wheel center point M and extends essentially in the transverse direction of the vehicle. The latter section 4b is inclined in relation to the vertical direction, in a lateral projection. To this end reference is also made to FIG. 4, where the two arrows 4b (above and below the center point M of the wheel) point to the section 4b extending perpendicular to the drawing plane in the viewing direction. At the same time these two arrows 4b point to a (round) edge, which is produced by the transition of section 4a into the section 4b of the support member 4. The inclination of the section 4b in relation to the vertical plane, which can be referred to, nevertheless, as approximately vertically oriented, is essentially equal to the inclination of the spread axis S, which is also depicted in this FIG. 4 and which will be discussed in detail below.

Figure 4:
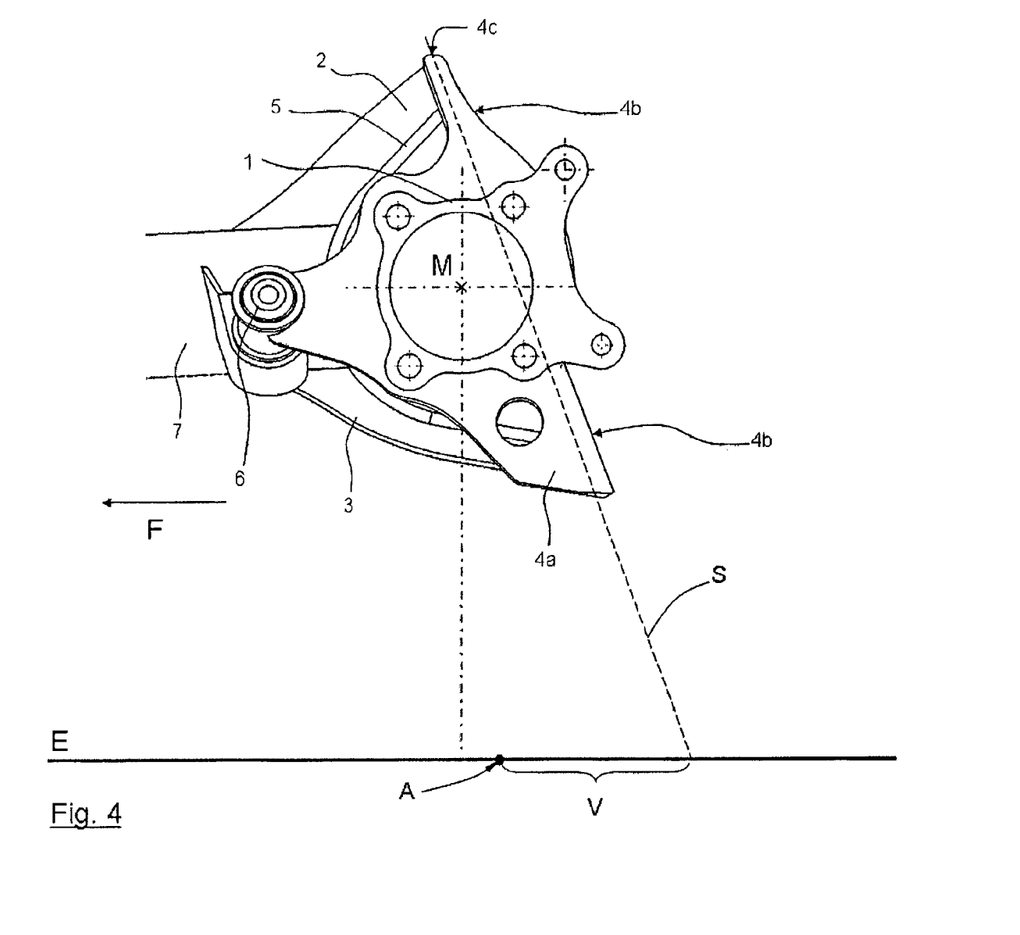
FIG. 4 is a side view of the wheel carrier from FIG. 2.
Figure 5:
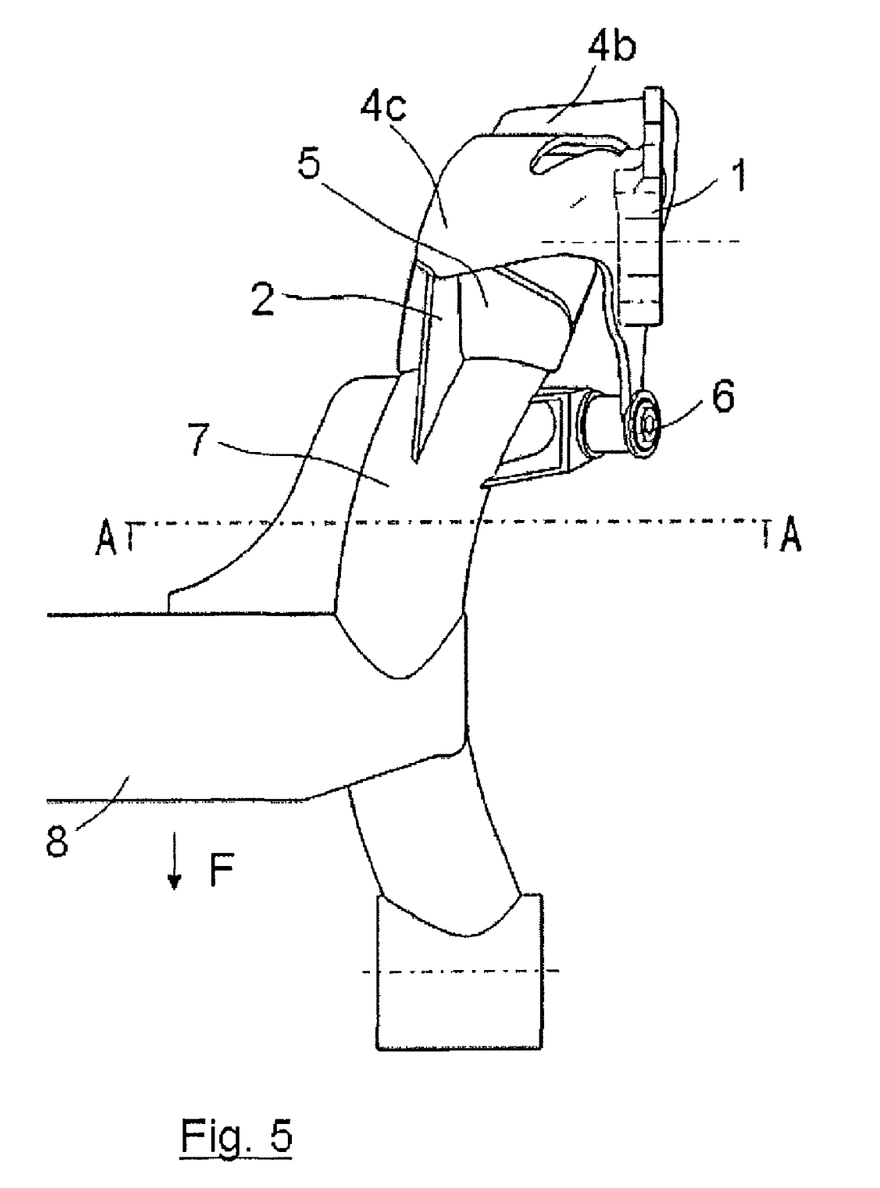
FIG. 5 is a top view of the wheel carrier from FIG. 2, including parts of the axle body.

Whereas the section 4a of the support member 4 quasi-surrounds the wheel carrier 1 and/or whereas the wheel carrier 1 is mounted on the section 4a and/or is supported by the same, the section 4a, which runs essentially parallel to the plane of the wheel carrier 1 is connected to an additional so-called web section 4c, which extends essentially in the transverse direction of the vehicle, in this case only above the wheel center point M. This web section 4c is also connected to or rather passes over, as also apparent from FIG. 5, into the section 4b, which extends essentially in the transverse direction of the vehicle and is aligned approximately vertically. In FIG. 4, this section 4c is indicated in the same way as section 4b, that is, by means of an arrow 4c.

Referring back to the aforementioned sheet metal support plate 5, by which the support member 4 is mounted on the axle body 7, it involves a structure, which is approximately U-shaped in a lateral projection (cf. besides FIG. 2 and FIG. 4 also the wheel carrier of this axle that is on the right side with respect to the direction of travel F in FIG. 1). At least the free ends of both legs of this sheet metal support plate 5, of which the first lies, as viewed in the vertical direction, above the center point M of the wheel, and the second lies below the center point M of the wheel, are connected preferably flush fitting with the support member 4. Preferably wherever this is possible, such a flush fitting connection is also provided on the edge of the legs of the sheet metal support plate 5. In its middle region (and thus in the region of the "base" of the U-shaped structure), the sheet metal support plate 5 is connected preferably flush fitting with the free end of the axle body 7. Furthermore, in order to enhance the rigidity of the support member 4 above the wheel center point M and/or below the wheel center point M there is in each case a sheet metal reinforcement plate 2 and/or 3, by which the support member 4 and the sheet metal support plate 5 are supported on the axle body 7.

Thus, these suitably structured sheet metal reinforcement plates 2 and 3 are connected preferably flush fitting with their free ends and/or side sections not only with the axle body 7 but also with the support member 4 and the sheet metal support plate 5.

One can also refer to a continuous upper support region "O" of the support member 4, in which the upper sheet metal reinforcement plate 2 with its end, opposite the axle body 7, and the sheet metal support plate 5, are supported, and in an analogous manner of a lower support region "U" of the support member 4, in which the lower sheet metal reinforcement plate 3 with its end, opposite the axle body 7, and the sheet metal support plate 5, are supported. Through these two support regions "O" and "U", which are especially visible in FIGS. 1, 2 and 6, runs the desired virtual spread axis S, because these two support regions "O" and "U" are in themselves extremely rigid, whereas the support member 4 away from these two support regions "O" and "U" exhibits a certain degree of flexibility. These sections 4a with 4c, on the one hand, and 4b, on the other hand, which exhibit a certain degree of flexibility with respect to the two support regions "O" and "U", can deform, in particular, to such an extent that this axis, which runs through these two support regions "O" and "U" and which involves a desired spread axis S, can be slightly pivoted in relation to each other, in order to produce the desired "toe-in" of the wheel at the outside of the curve under the effect of a lateral force.

FIG. 3 shows the flexurally flexible areas "B" (defined by dashed lines) of the support member 4. In these areas the pivot motion (mentioned in the preceding paragraph) of the section 4b of the support member 4 in relation to the sections 4a and 4c of the support member 4 about the spread axis S can occur. This spread axis S is depicted in FIGS. 4 and 6.

FIG. 4, which indicates the direction of travel of the vehicle with the arrow F, shows that the inclination of the section 4b of the support member 4 that extends in the transverse direction of the vehicle in relation to the vertical plane determines in this lateral projection the essentially identical inclination of the virtual spread axis S. Above the intersecting point of this spread axis S with the wheel contact plane E the result is a negative caster offset V of the wheel contact point A, which in the case of the lateral force acting perpendicularly to the drawing plane on the wheel at the outside of the curve in this drawing of the figure, effects a toe-in steering and, thus, an under-steering, stabilizing vehicle behavior.

Figure 6:
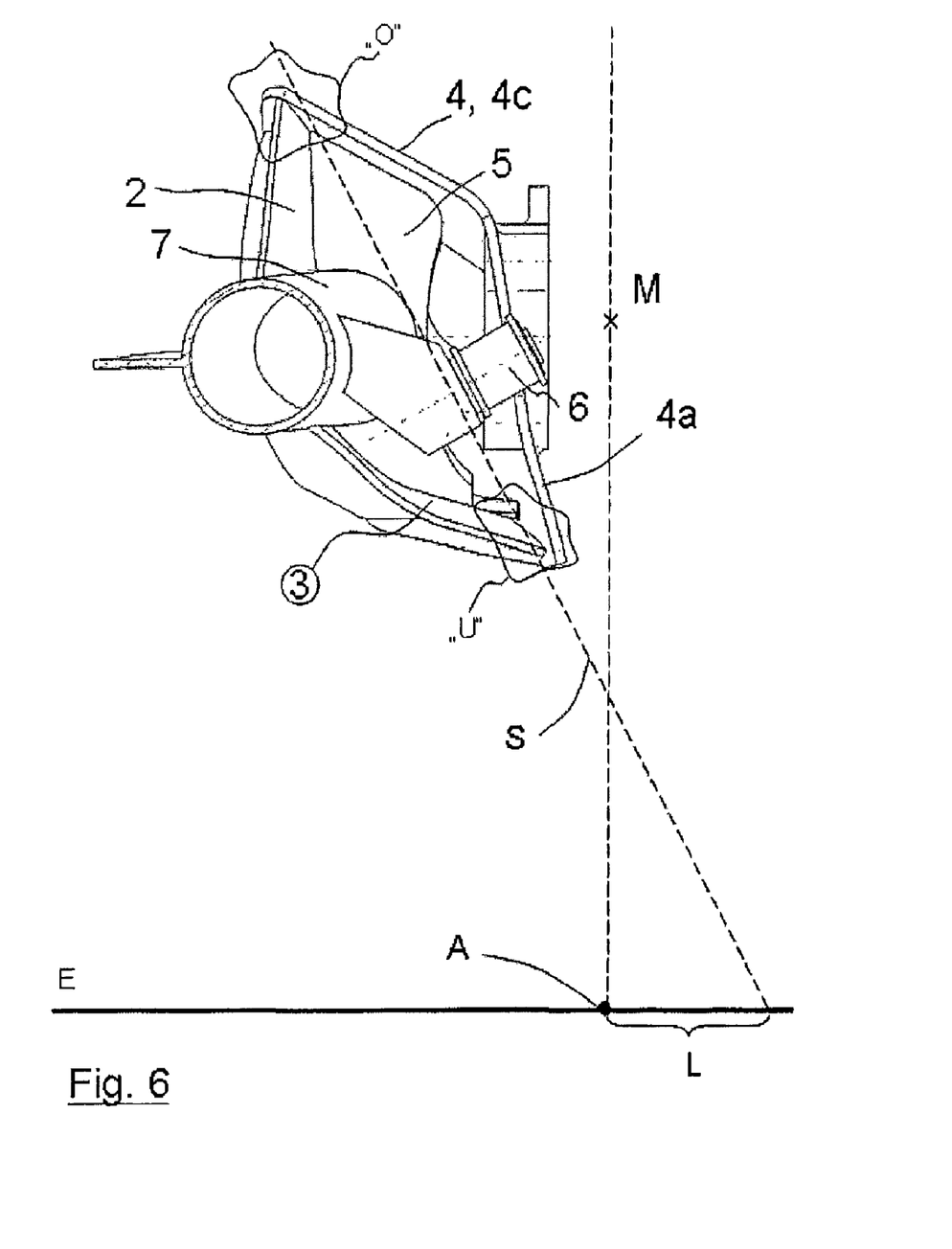
FIG. 6 is a sectional view taken along the line A-A from FIG. 5.

FIG. 6, which is a view in the longitudinal direction of the vehicle, shows that the virtual spread axis S is also determined in essence by the upper support region "O" and the lower support region "U" of the support member 4. This view shows very clearly that owing to the targeted positioning of these two support regions "O" and "U", that is, in that the upper support region "O" lies, as viewed in the transverse direction of the vehicle, in considerably closer proximity to the center (located on the left side in this drawing of the figure) of the vehicle or the axle of the vehicle than the said lower support region "U", which, lies, as viewed in the transverse direction of the vehicle, relatively far on the outside (and in this drawing of the figure as far to the right side as possible), the virtual spread axis S, which is determined by the upper and the lower support region, is inclined in relation to the vertical plane in such a manner that a negative steering roll axis L is formed with its advantages known to the person skilled in the art.

If, for example, the lower support region "U" and/or the lower sheet metal reinforcement plate 3 is elongated or shifted further outwards (in FIG. 6 to the right), then the lower spread axis point also migrates further outwards, and the steering roll radius L increases in the "negative" direction, a feature that has a higher understeering effect during braking operations of the vehicle (and, thus, in the event of longitudinal forces engaging at the wheel at the contact point).

Moreover, a variation in the wall thickness of the support member 4 can also change its flexural flexibility about the spread axis S and, thus, the understeering effect that can be achieved with the axle according to the invention, assuming that the structural durability requirements permit this technical measure. In this context, the support member 4 and/or certain regions thereof can have one or more recesses, as is the case in the present embodiment in the form of the recess 10 in the section 4b of the support member 4 (cf. in particular FIG. 3).

Furthermore, the figures illustrate an additional connecting element 6, which has already been described briefly and which is shown here in the form of a rubber bearing, which exhibits a certain degree of flexibility in the axial direction, this runs in FIG. 4 essentially perpendicular to the drawing plane, and by means of which the section 4a of the support member 4 that extends parallel to the wheel carrier 1 (and, thus, indirectly also the wheel carrier 1) is supported additionally on the axle body 7 away from the virtual spread axis S. With this flexible support it is possible to adjust and, in particular, also to damp in the desired manner, the pivot motion of the wheel carrier 1 that occurs, in particular, under the influence of a lateral force as a function of the steering roll radius, but also under the influence of a longitudinal force, about the spread axis S. The additional advantages of such a connecting element 6 have already been described prior to the description of this embodiment.

A rear axle construction according to the invention is especially suitable for twist beam type axles, longitudinal trailing arm type axles, diagonal trailing arm type axles, rigid axles and/or for all axles that unintentionally "toe-out," in particular, in the event of a lateral force, optionally also in the event of a longitudinal force. Owing to a defined flexural flexibility of the support member 4 of the wheel carrier 1, which can be, as a matter of fact, an integral component of the wheel carrier 1, such that the wheel carrier 1 itself has a certain degree of flexural flexibility, a virtual spread axis is formed.

When viewed in the direction of travel F, the intersecting point of the spread axis with the wheel contact plane E lies behind the wheel contact point (cf. FIG. 4) and preferably, in addition, when viewed in the transverse direction of the vehicle, lies outside the wheel carrier 1 (cf. FIG. 6), so that the result is a negative caster offset V with the additional criterion advantageously of a negative steering roll radius L. In addition to this positive property with respect to the driving dynamics, no additional rubber bearings or ball joints are necessary in the simplest case, or optionally only the additional connecting element 6, depicted herein, so that the conditions for a simple and cost effective axle construction are met.

It should be pointed out that the sheet metal support plate 5 is already formed in the present invention in such a way that an output shaft can run in the transverse direction of the vehicle in relation to the wheel carrier 1, so that it is also quite possible to drive a rear axle according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A countersteering rear axle for use in a vehicle having a wheel mounted on a wheel carrier, the countersteering rear axle comprising:
    an axle body extending essentially in a longitudinal direction of the vehicle;
    a sheet metal support member operatively configured to support the wheel carrier on the axle body, wherein the countersteering rear axle induces a rotational motion of the wheel carrier about a virtual spread axis in a toe-in direction under a lateral force influence on the wheel which is an outside wheel during cornering;
    wherein the support member has a first section extending essentially parallel to a plane of the wheel carrier and a second section extending essentially in a transverse direction of the vehicle, the second section being connected to the first section behind a wheel center point when viewed in a direction of travel, a lateral projection of the second section being inclined in relation to a vertical direction essentially similarly to the virtual spread axis; and
    a sheet metal support plate having free ends on which is supported the support member, the sheet metal support plate having an approximately U-shape in a lateral projection and being mounted on the axle body.

2. The rear axle according to claim 1, wherein the support member further comprises a web section extending essentially in the transverse direction of the vehicle, the web section being connected to the first section at least one of above and below the wheel center point; and
    wherein the web section is also connected to the second section.

3. The rear axle according to claim 2, further comprising a sheet metal reinforcement plate operatively arranged at least one of above and below the wheel center point, the sheet metal reinforcement plate supporting the support member and the sheet metal support plate on the axle body.

4. The rear axle according to claim 3, wherein the support member has a continuous upper support region and a continuous lower support region, the continuous upper support region being the region where an upper portion of the sheet metal reinforcement plate whose end is opposite the axle body and the sheet metal support plate are supported, the continuous lower support region being the region where a lower portion of the sheet metal reinforcement plate whose end is opposite the axle body and the sheet metal support plate are supported; and
    wherein the continuous upper support region lies in closer proximity to a center of the vehicle or an axle than the continuous lower support region as viewed in a transverse direction of the vehicle; and
    wherein the virtual spread axis extending through the upper and lower support regions is inclined in relation to a vertical plane viewed in a longitudinal direction of the vehicle such that a negative steering roll radius is formed.

5. The rear axle according to claim 4, further comprising an additional connecting element exhibiting a defined degree of flexibility; and
    wherein the first section of the support member extending essentially parallel to the plane of the wheel carrier is supported on the axle body away from the virtual spread axis via the additional connecting element.

6. The rear axle according to claim 4, wherein at least one recess is provided in a region of the support member.

7. The rear axle according to claim 3, further comprising an additional connecting element exhibiting a defined degree of flexibility; and
    wherein the first section of the support member extending essentially parallel to the plane of the wheel carrier is supported on the axle body away from the virtual spread axis via the additional connecting element.

8. The rear axle according to claim 7, wherein at least one recess is provided in a region of the support member.

9. The rear axle according to claim 3, wherein at least one recess is provided in a region of the support member.

10. The rear axle according to claim 1, further comprising a sheet metal reinforcement plate operatively arranged at least one of above and below the wheel center point, the sheet metal reinforcement plate supporting the support member and the sheet metal support plate on the axle body.

11. The rear axle according to claim 10, wherein the support member has a continuous upper support region and a continuous lower support region, the continuous upper support region being the region where an upper portion of the sheet metal reinforcement plate whose end is opposite the axle body and the sheet metal support plate are supported, the continuous lower support region being the region where a lower portion of the sheet metal reinforcement plate whose end is opposite the axle body and the sheet metal support plate are supported; and
    wherein the continuous upper support region lies in closer proximity to a center of the vehicle or an axle than the continuous lower support region as viewed in a transverse direction of the vehicle; and wherein the virtual spread axis extending through the upper and lower support regions is inclined in relation to a vertical plane viewed in a longitudinal direction of the vehicle such that a negative steering roll radius is formed.

12. The rear axle according to claim 1, further comprising an additional connecting element exhibiting a defined degree of flexibility; and wherein the first section of the support member extending essentially parallel to the plane of the wheel carrier is supported on the axle body away from the virtual spread axis via the additional connecting element.

13. The rear axle according to claim 1, wherein at least one recess is provided in a region of the support member.

\* \* \* \* \*